United States Patent
Girondi

(10) Patent No.: US 7,141,163 B2
(45) Date of Patent: Nov. 28, 2006

(54) LIQUID FILTER FOR VEHICLE INTERNAL COMBUSTION ENGINES

(75) Inventor: Giorgio Girondi, Mantova (IT)

(73) Assignee: UFI Filters S.p.A., Porto Mantovano (IT)

( * ) Notice: Subject to any disclaimer, the term of this patent is extended or adjusted under 35 U.S.C. 154(b) by 390 days.

(21) Appl. No.: 10/477,397

(22) PCT Filed: Jun. 6, 2002

(86) PCT No.: PCT/EP02/06318

§ 371 (c)(1),
(2), (4) Date: Nov. 12, 2003

(87) PCT Pub. No.: WO02/100511

PCT Pub. Date: Dec. 19, 2002

(65) Prior Publication Data

US 2004/0154975 A1    Aug. 12, 2004

(30) Foreign Application Priority Data

Jun. 12, 2001 (IT) .......................... RE2001A0065

(51) Int. Cl.
  *B01D 27/08* (2006.01)
(52) U.S. Cl. .................. 210/232; 210/236; 210/444
(58) Field of Classification Search ............... 210/232, 210/236–238, 435, 451, 452, 454, 497, 440–444
  See application file for complete search history.

(56) References Cited

U.S. PATENT DOCUMENTS

| 4,989,636 A | * | 2/1991 | Hunter et al. ............... 137/557 |
| 5,128,034 A | | 7/1992 | Kool |
| 5,695,633 A | | 12/1997 | Ernst et al. |
| 5,698,097 A | * | 12/1997 | Gebert et al. ............... 210/248 |
| 5,837,137 A | * | 11/1998 | Janik ........................... 210/232 |
| 6,251,273 B1 | * | 6/2001 | Jawurek et al. ............. 210/232 |

FOREIGN PATENT DOCUMENTS

| DE | 42 01 041 | 7/1993 |
| DE | 197 07 132 | 8/1998 |
| DE | 299 16 265 | 2/2001 |
| EP | 0 612 549 | 8/1994 |
| WO | WO 00/09238 | 2/2000 |
| WO | WO 00/21640 | 4/2000 |

* cited by examiner

*Primary Examiner*—Terry K. Cecil
(74) *Attorney, Agent, or Firm*—Browdy and Neimark, PLLC

(57) ABSTRACT

A filter cartridge (20) having an upper disc (22) joined to an upper end of a tubular filter medium (21) is positioned within a casing (11) having an upper closure cover (12). First coupling elements (31) joined to the cover (12) and second coupling elements (41) joined to the upper disc (22) project axially towards each another to achieve mutual snap-coupling. The first coupling elements (31) include axially-extending coupling teeth elastic in a radial direction, and the second coupling elements (41) include a cylindrical surface divided into identical sectors equal to the number of teeth (31), each sector includes a coupling region (43) for snap-engaging the coupling teeth (31) axially, and a disengagement region (44), positioned to the side of the coupling region (43), for releasing the coupling teeth (31) from their engagement with the coupling region (43) by rotating the cartridge (20) through a small angle relative to the upper cover (12).

8 Claims, 4 Drawing Sheets

US 7,141,163 B2

LIQUID FILTER FOR VEHICLE INTERNAL COMBUSTION ENGINES

TECHNICAL FIELD

This invention relates to a liquid filter for vehicle internal combustion engines, in particular for oil or diesel fuel.

BACKGROUND ART

For some years filters have been constructed having an outer casing and an upper closure cover, which enclose an inner chamber having an inlet for the liquid to be filtered and an outlet for the filtered liquid, and a filter cartridge having a tubular filter medium positioned inside the inner chamber to separate the chamber into a first region communicating with the inlet and a second region communicating with the outlet.

The filter cartridge is secured to the upper cover by an upper disc joined to the upper end of the filter medium and which, when consumed and needing replacement, is separated from the cover and replaced with a new cartridge.

Said filters are currently appreciated because the entire filter does not have to be scrapped and destroyed, but merely the spent filter cartridge. Accessibility to the cartridge is also facilitated in that, as this is secured to the closure cover of the casing, on opening the cover the cartridge follows it to emerge from the liquid in which it is immersed without having to be gripped with tools and without having to be shaken out or disengaged, which could cause damaging dirt to separate from it.

To secure the cartridge to the cover it is known (see U.S. Pat. No. 5,695,633 in particular) to use first coupling elements and second coupling elements which act together to achieve a mutual snap connection, the first coupling elements (or the second coupling elements) being joined to the cover and projecting axially towards the chamber interior and, vice versa, the second coupling elements (or the first coupling elements) being joined to the upper disc and projecting axially towards the upper cover.

A drawback of these filters is that, while there are no difficulties in coupling the cover and filter cartridge together, a considerable axial force is however required to separate these elements when a spent cartridge has to be replaced with a new one. If carried out manually, this separation operation, in addition requiring considerable force, can also, because of the fact that the spent cartridge is impregnated with oily impurities and miscellaneous dirt, cause these impurities and dirt to spatter all around, with the risk of soiling the operator and also the inner chamber of the filter.

An object of this invention is therefore to provide a filter of the aforedescribed type, in which the filter cartridge can be rapidly coupled to the casing cover and be easily and delicately released therefrom.

DISCLOSURE OF THE INVENTION

This and further objects are attained by the invention as characterised in the claims.

The invention is based on the fact of comprising first coupling elements having axially extending coupling teeth with elastic action in a radial direction, and second coupling elements having an overall cylindrical surface divided into a number of identical sectors equal to the number of coupling teeth, each sector comprising a coupling region for snap-engaging the coupling teeth axially, and a disengagement region, positioned to the side of the coupling region, for releasing the coupling teeth from their engagement with the coupling region by rotating the cartridge through a small angle relative to the upper cover.

BRIEF DESCRIPTION OF THE DRAWINGS

The invention is described in detail hereinafter with the aid of the accompanying figures which show one embodiment thereof by way of non-exclusive example.

DETAILED DESCRIPTION OF THE DRAWINGS

Figure 1:
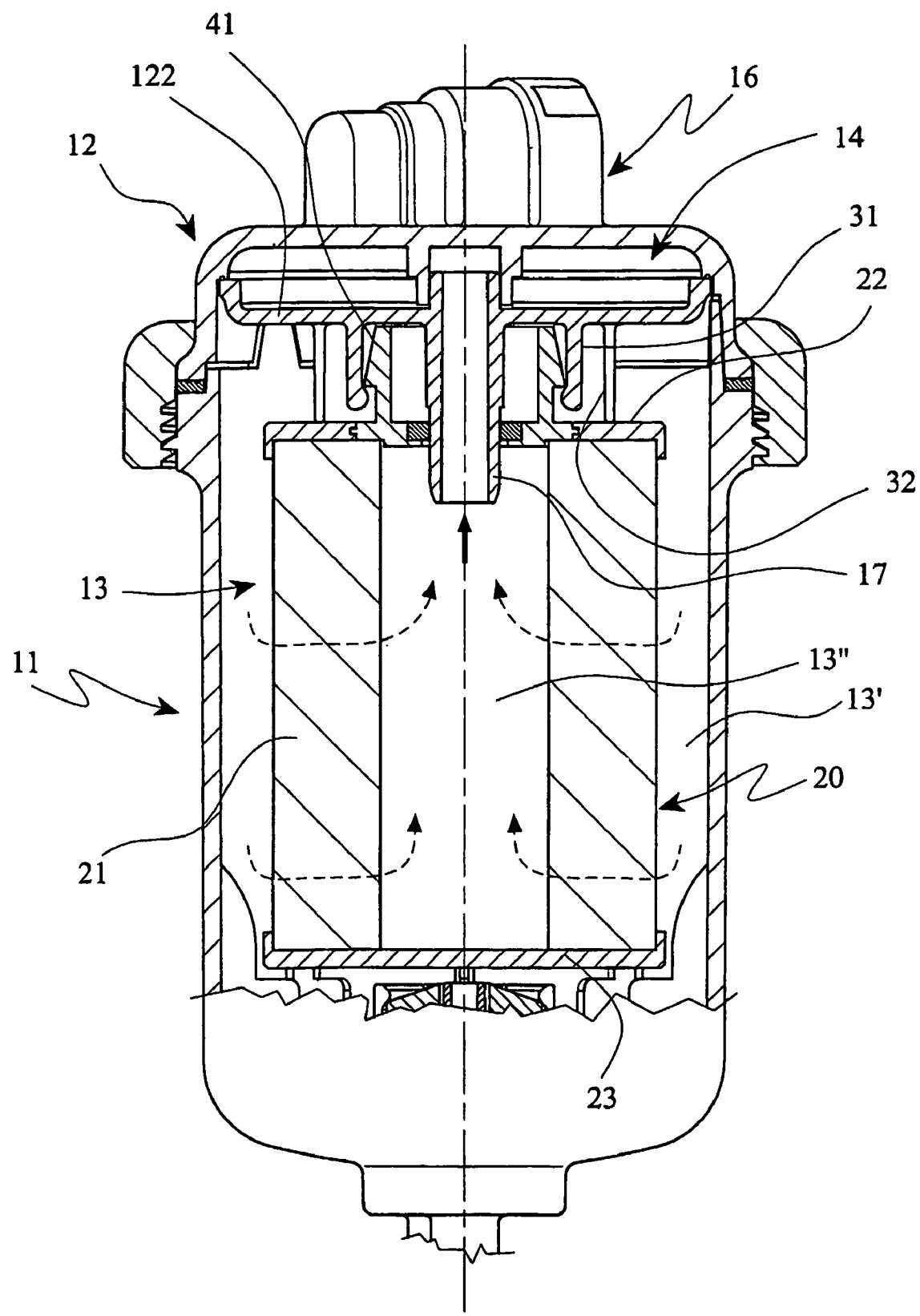
FIG. 1 is an overall axial section through the entire filter.
Figure 1A:
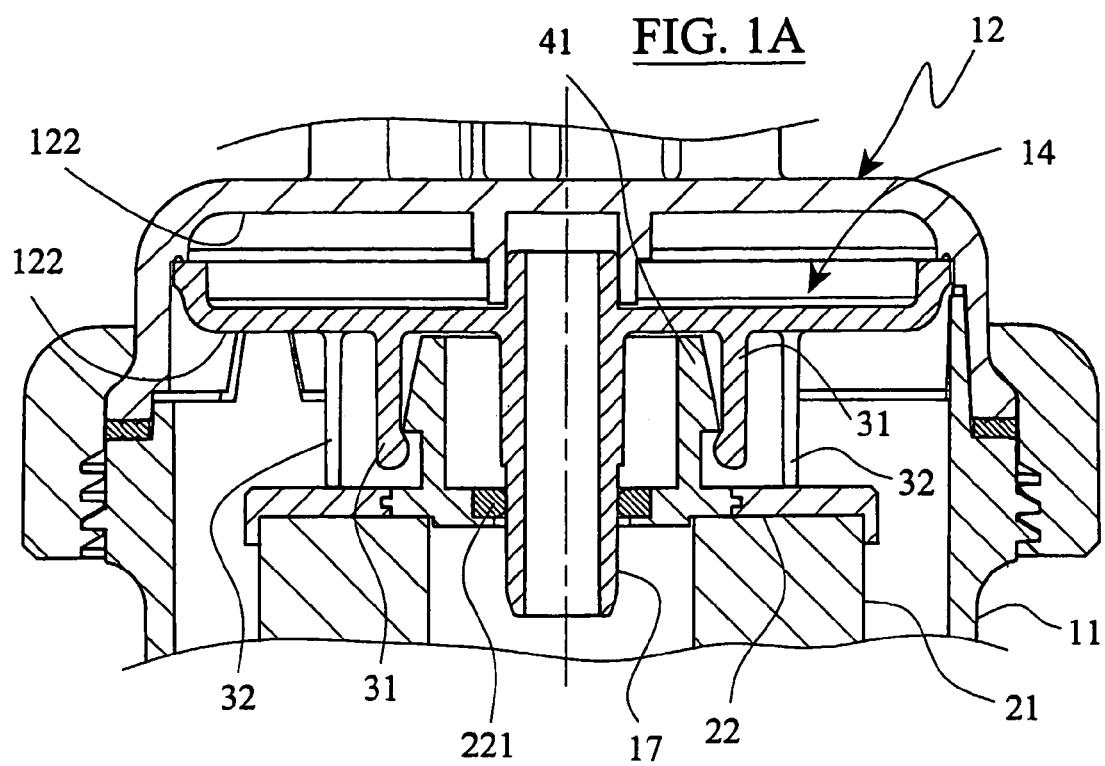
FIG. 1A is an enlarged detail of FIG. 1.

The figures of the invention comprise an upperly open outer casing 11, in particular of roughly cylindrical shape, having an upper closure cover 12, and enclosing a roughly cylindrical inner chamber 13.

The chamber 13 possesses an inlet (not shown in the figures) for the liquid to be filtered which, in the embodiment shown in the figures, is positioned laterally on the cylindrical surface of the casing 11, and an outlet 16 for the filtered liquid which, in the embodiment shown in the figures, is positioned on the upper cover 12.

In the interior of the chamber 13 there is positioned a filter cartridge 20 having a tubular filter medium 21 positioned inside the inner chamber 13, which separates the chamber into a first region 13' communicating with the inlet and a second region 13" communicating with the outlet 16.

The cartridge 20 also comprises an upper disc 22, in the form of a circular plate, which entirely and exactly covers the flat annular upper surface of the filter medium 21 and is rigidly joined to it. The cartridge 20 finally comprises a lower disc 23, in the form of a circular plate, which entirely and exactly covers the flat annular lower surface of the filter medium 21 and is rigidly joined to it.

In the embodiment shown in the figures, the cover 12 possesses a substantially flat chamber 14 defined between the upper inner surface 12a of the cover and, spaced from the surface 12a, a lower circular wall 122 joined rigidly to and forming part of the cover 12. Said chamber 14 communicates with the outlet 16 and with the region 13" in the interior of the filter medium 21 by an axial tube 17 which passes through an aperture provided in the centre of the upper disc 22. A gasket 221 forms a hermetic seal between the disc 22 and the tube 17.

The filter also possesses first coupling elements and second coupling elements acting together to form a mutual snap engagement. In the embodiment shown in the figures, the first coupling elements are joined to the cover 12 (in particular they are integral with the wall 122) and project axially downwards, towards the interior of the chamber 13, whereas the second coupling elements are integral with the upper disc 22 and project axially upwards, towards the upper cover 12. In an alternative embodiment (not shown in the figures) the second coupling elements projecting axially downwards towards the interior of the chamber 13 are joined to the cover 12, and vice versa the first coupling elements are joined to the upper disc 22 and project axially upwards towards the upper cover 12.

According to the invention, said first coupling elements comprise two or more axially extending coupling teeth 31 with elastic action in the radial direction, whereas said second coupling elements comprise a tubular body 41 having an overall cylindrical outer surface divided into a number of identical sectors equal to the number of coupling teeth 31.

Each sector of the cylindrical surface defines a coupling region 43 for axially snap-engaging the coupling teeth 31, and a disengagement region 44, positioned to the side of the coupling region, for releasing the coupling teeth 31 from their engagement with the coupling region 43 by rotating the cartridge 20 relative to the upper cover 12 through a small angle.

Figure 4A:
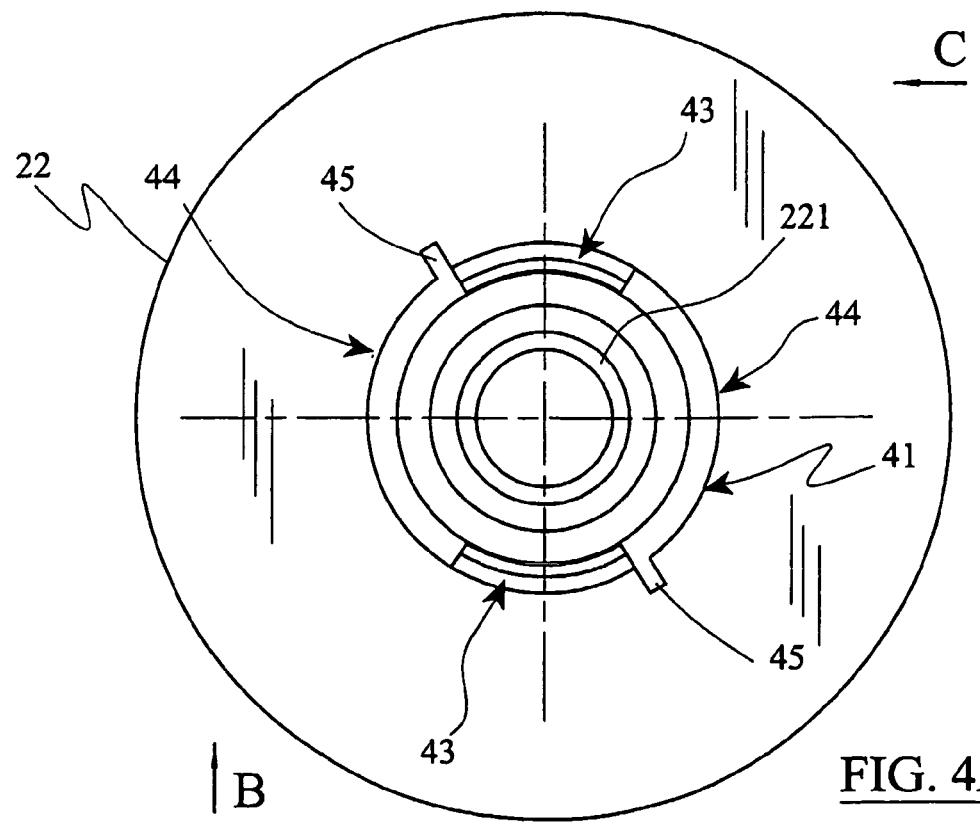
FIG. 4A is a plan view from above of the disc of FIG. 3.
Figure 2:
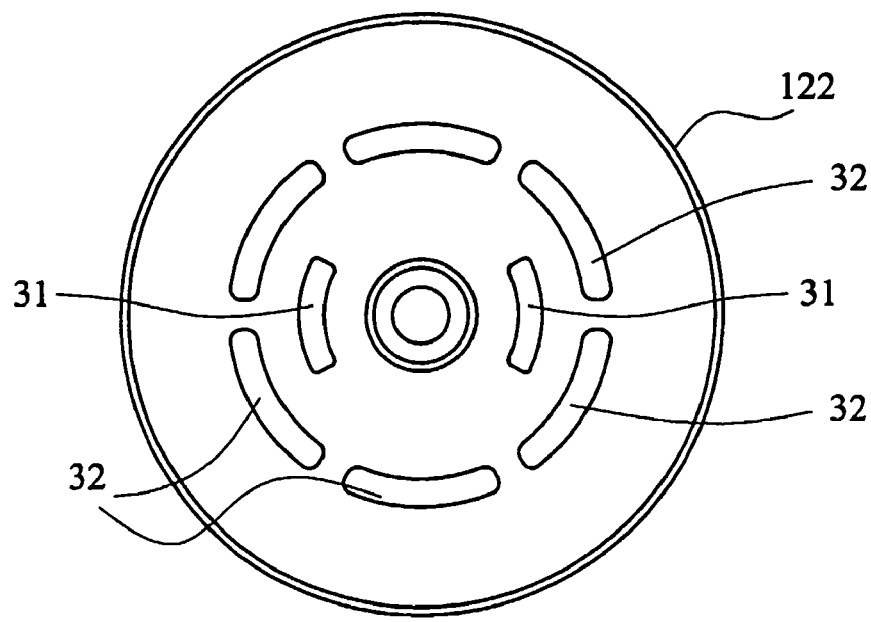
FIG. 2 is a plan view from below of just the central element of the upper cover of FIG. 1.
Figure 3:
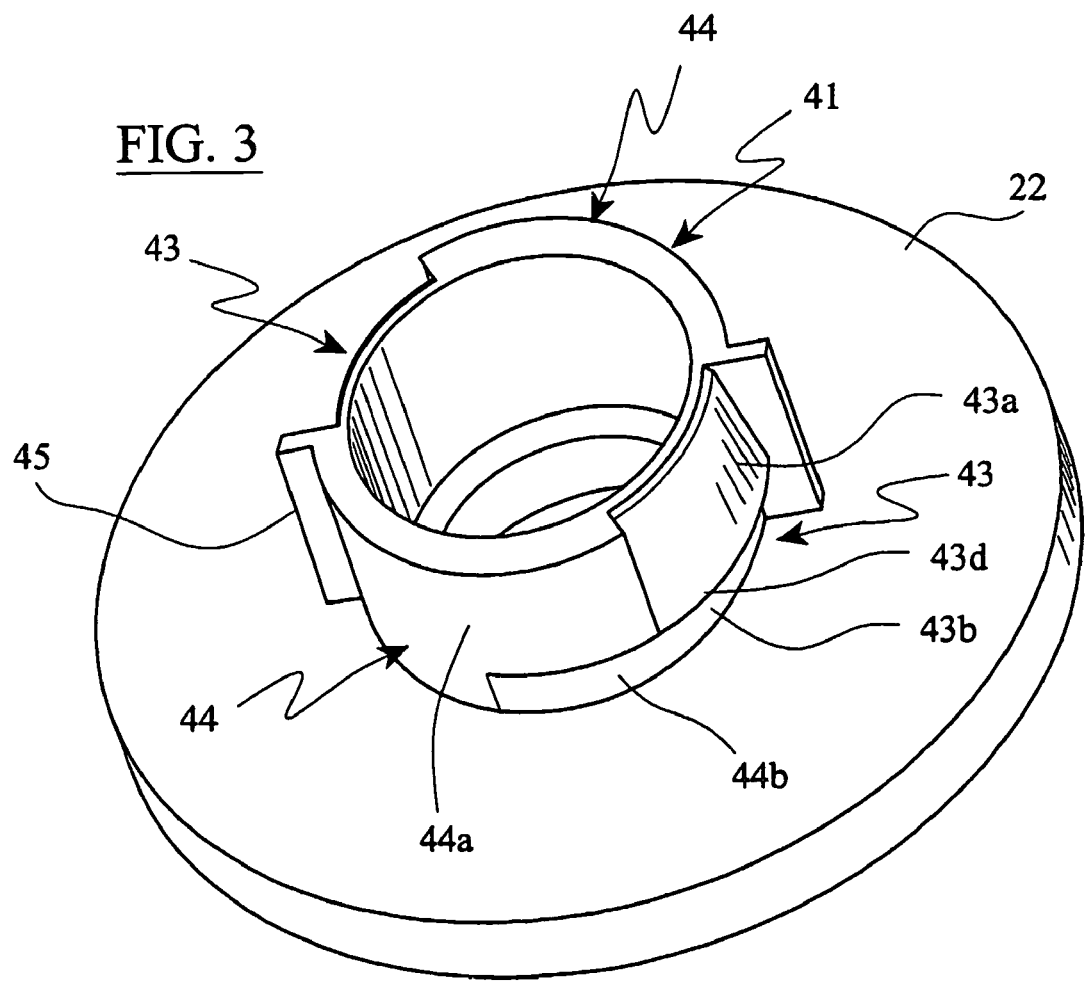
FIG. 3 is a perspective view of just the upper disc for the cartridge of FIG. 1.
Figure 4D:
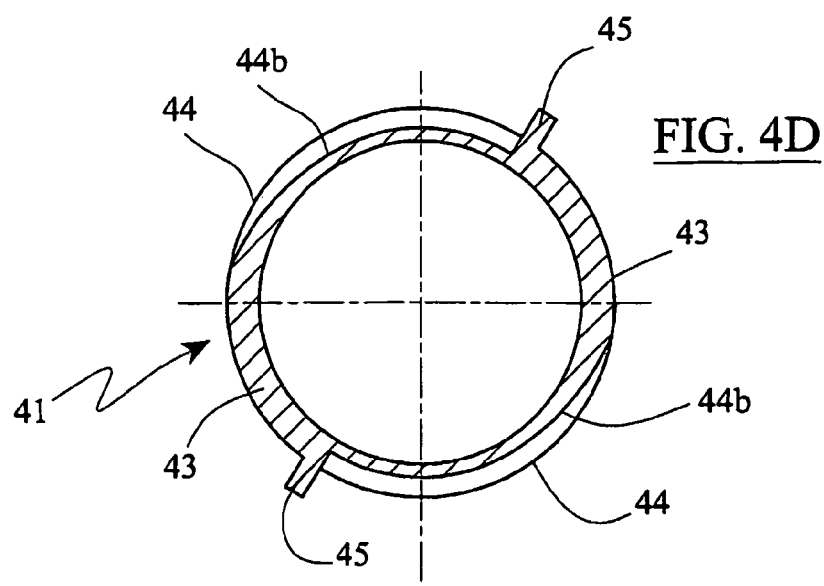
FIG. 4D is a section on the plane D—D of FIG. 4B.
Figure 4B:
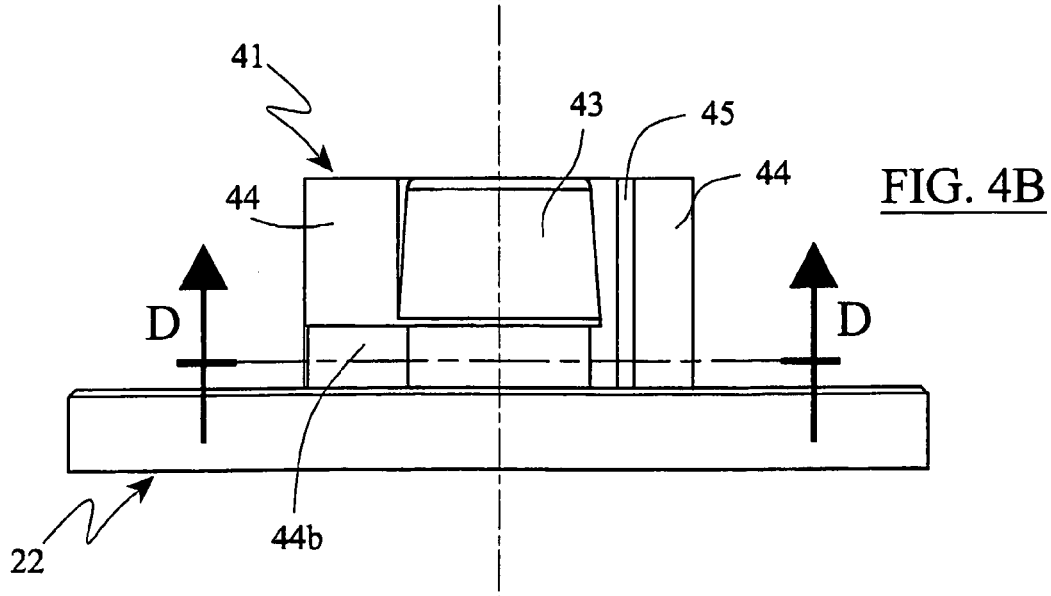
FIG. 4B is a side view in the direction of the arrow B of FIG. 4A.
Figure 4C:
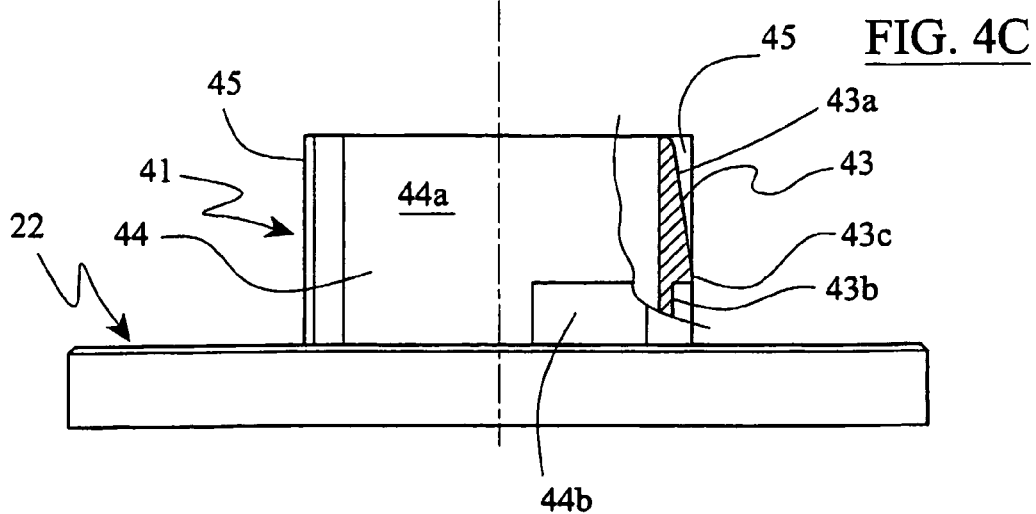
FIG. 4C is another side view in the direction of the arrow C of FIG. 4A.

Specifically, each said coupling region 43 defines, in cross-section, a second coupling tooth complementary to the first coupling teeth 31 and arranged to snap-receive the first coupling teeth 31 by mutual approach in an axial direction, and engage them. In detail (see FIGS. 4A—4C specifically), the coupling region 43 possesses a slightly inclined upper portion 43a, the radius of which increases downwards, followed by a lower groove 43b which forms a sharp edge 43d in the form of a saw tooth, to engage a first coupling tooth 31.

The disengagement region 44 comprises a smooth cylindrical surface portion 44a extending over the entire height, and an arc-shaped surface strip 44b forming a connection ramp which continuously degrades along the circumference from the groove 43b to the surface portion 44a, to transfer the coupling teeth from said groove 43b to the smooth cylindrical surface 44a.

On the other side of the coupling region 43 there is a rectilinear rib 45, which separates the coupling region 43 of one sector from the coupling region 44 of the other sector, and projects radially outwards from the surrounding regions 43 and 44.

The cover 12 also comprises downwardly projecting abutment elements which abut with their lower end against the upper surface of the upper disc 22 when the coupling elements are mutually engaged. In particular, said elements 32 consist of identical tube segments positioned on the same coaxial cylindrical surface external to the coupling teeth 31.

When the coupling teeth 31 engage the respective sharp edges 43d, the elements 32 abut against the upper surface of the disc 22; by virtue of this abutment, the disc 22 is maintained at an exact axial distance from the cover 12 and in addition the connection between said coupling elements is made free of any slack, as the edges 43d and the edges of the coupling teeth 31 are maintained urged against each other.

When in use, to couple the cartridge 20 to the cover 12, the cartridge is brought towards the cover 12 in an axial direction so that the coupling regions 43 pass between the coupling teeth 31; mutual coupling is achieved by snap-inserting the projections of the teeth 31 into the grooves 43b. The two coupling regions 43 act, together with the guide action produced by the ribs 45, as lead-in tracks to allow reliable insertion by pressing without excessive force.

Rotating the cartridge about its axis during pressing enables these lead-in tracks to be reliably encountered. Coupling is confirmed, and audibly sensed, by the abrupt entry of the teeth 32 into the grooves 43b.

The cartridge 20 can no longer be moved from this stable position except by exerting on it the correct release movement. In this respect, the sharp edge 43d prevents any release of the cartridge 20 by the effect of the forces generated by the pressure changes within the complete filter unit.

The cartridge 20 is released by a two-stage movement; in the first stage the cartridge 20 is rotated (a relatively small torque is sufficient) through a small angle to cause the edges of the teeth 31 to slide along the respective connection ramps 44B (with consequent forcing-apart of the teeth 31) until these edges lie on the smooth surface portions 44a. At this point, by axially pulling the cartridge 20 away from the cover 12, the teeth 31 are separated from the tubular body 41 and the cartridge is released.

In this manner the filter medium 21 can be separated from the body of the filter without exerting force at the moment of its release, so preventing liquid escaping and spattering outwards.

Numerous modifications of a practical and applicational nature can be made to the invention, but without leaving the scope of the inventive idea as claimed below.

The invention claimed is:

1. A filter for vehicle internal combustion engines, comprising an outer casing (11) and an upper closure cover (12) which enclose an inner chamber (13) having an inlet for the liquid to be filtered and an outlet for the filtered liquid, a filter cartridge (20) having a tubular filter medium (21) positioned inside the inner chamber (13), to separate the filter inner chamber (13) into a first region communicating with the inlet and a second region communicating with the outlet, and an upper disc (22) joined to the upper end of the filter medium (21), first coupling elements (31) and second coupling elements (41) acting together to achieve mutual snap-coupling, the first coupling elements (31) or the second coupling elements (41) being joined to the cover (12) and projecting axially towards the interior of the chamber (13) and, vice versa, the second coupling elements (41) or the first coupling elements (31) formed as a unit with the upper disc (22) and projecting axially towards the upper cover (12), wherein said first coupling elements (31) comprise axially extending coupling teeth with elastic action in a radial direction, said second coupling elements (41) comprising an overall cylindrical surface divided into a number of identical sectors equal to the number of coupling teeth (31), each sector comprising a coupling region (43) for snap-engaging the coupling teeth (31) axially, and a disengagement region (44), positioned adjacent to the side of the coupling region (43), for sliding the coupling teeth (31) from their engagement position on the coupling region (43) by rotating the cartridge (20) through a small angle relative to the upper cover (12), and wherein said disengagement region (44) comprises a smooth cylindrical surface portion (44a) extending over a height thereof, and an arc-shaped surface strip (44b) forming a connection ramp in a plane transverse to the axis of the filter cartridge beginning in the coupling region and extending to the smooth cylindrical surface position to transfer the coupling teeth (31) from a toothed groove (43b) in the coupling region to the smooth cylindrical surface portion (44a), the ramp radially decreasing in a circumferential direction.

2. A filter as claimed in claim 1, characterised in that each said coupling region (43) defines a second coupling tooth complementary to the first coupling teeth (31) and arranged to snap-receive the first coupling teeth (31) by mutual approach in an axial direction, and engage them.

3. A filter as claimed in claim 1, characterised by comprising axial abutment elements (32) projecting from the upper cover (12) and arranged to abut against the upper surface of the upper disc (22) when said coupling elements (31 and 41) are mutually engaged, to exactly define the distance between the cover (12) and the disc (22) and render the connection between said coupling elements (31, 42) free of slack.

4. A filter as claimed in claim 3, wherein said abutment element (32) are conical tube segments.

5. A filter as claimed in claim 4, wherein the tube segments are external of the coupling elements.

6. A filter as claimed in claim 1, characterised by comprising axial abutment elements (32) projecting from the upper disc (22) and arranged to abut against the lower surface of the upper cover (12) when said coupling elements (31 and 41) are mutually engaged, to exactly define the distance between the cover (12) and the disc (22) and render the connection between said coupling elements (31, 42) free of slack.

7. A filter as claimed in claim 6, wherein said abutment element (32) are conical tube segments.

8. A filter as claimed in claim 7, wherein the tube segments are external of the coupling elements.

* * * * *